United States Patent
Amano et al.

(10) Patent No.: US 7,904,237 B2
(45) Date of Patent: Mar. 8, 2011

(54) ELECTRONIC DEVICE AND ELECTRONIC DEVICE OPERATION CONTROL METHOD

(75) Inventors: Hiroshi Amano, Tokyo (JP); Takumi Arie, Kanagawa (JP); Yasuo Mutoh, Tokyo (JP); Yoshimi Nakada, Tokyo (JP)

(73) Assignee: Sony Corporation, Tokyo (JP)

( * ) Notice: Subject to any disclaimer, the term of this patent is extended or adjusted under 35 U.S.C. 154(b) by 685 days.

(21) Appl. No.: 11/828,585

(22) Filed: Jul. 26, 2007

(65) Prior Publication Data

US 2008/0051986 A1 Feb. 28, 2008

(30) Foreign Application Priority Data

Aug. 23, 2006 (JP) ................................. 2006-226369

(51) Int. Cl.
*G01C 21/00* (2006.01)

(52) U.S. Cl. ........................................ 701/200; 709/217

(58) Field of Classification Search .................. 701/200; 235/470; 709/204, 217
See application file for complete search history.

(56) References Cited

U.S. PATENT DOCUMENTS

| 6,729,550 B2* | 5/2004 | Seita et al. ..................... 235/492 |
| 7,245,937 B2* | 7/2007 | Maari ............................ 455/558 |
| 2003/0130906 A1* | 7/2003 | Maari ............................. 705/26 |
| 2007/0228160 A1* | 10/2007 | Takayanagi .................... 235/380 |
| 2007/0234405 A1* | 10/2007 | Chikada et al. ..................... 726/3 |
| 2009/0178127 A1* | 7/2009 | Ogino et al. ...................... 726/7 |

FOREIGN PATENT DOCUMENTS

| JP | 2005-56150 | 3/2005 |
| WO | WO 03/044679 A1 | 5/2003 |

* cited by examiner

*Primary Examiner* — Mark Hellner
(74) *Attorney, Agent, or Firm* — Oblon, Spivak, McClelland, Maier & Neustadt, L.L.P.

(57) ABSTRACT

Disclosed herein is an electronic device including: a reader configured to read information from a noncontact-type communications device storing unique identification information; and a controller configured to determine whether the identification information read by the reader is already registered or not yet registered and, if the identification information is found already registered, get user setting information corresponding to the identification information to execute setting processing on the basis of the user setting information and, if the identification information is found not yet registered, execute processing for registering the identification information.

15 Claims, 9 Drawing Sheets

FIG.2

| REGISTRATION NO. | CARD ID | CODE NUMBER | USER SETTING INFORMATION |
|---|---|---|---|
| #001 | ID001 | 125633 | D01 |
| #002 | ID002 | 511197 | D02 |
| ⋮ | ⋮ | ⋮ | ⋮ |

BRING THE IC CARD OF "USER B" IN THE PROXIMITY OF THE CARD READER

BRING THE IC CARD OF CURRENTLY LOGGED "USER A" INTO THE PROXIMITY OF THE CARD READER

FIG.6C

SELECT "OK"

ELECTRONIC DEVICE AND ELECTRONIC DEVICE OPERATION CONTROL METHOD

CROSS REFERENCES TO RELATED APPLICATIONS

The present invention contains subject matter related to Japanese Patent Application JP 2006-226369 filed in the Japan Patent Office on Aug. 23, 2006, the entire contents of which being incorporated herein by reference.

BACKGROUND OF THE INVENTION

1. Field of the Invention

The present invention relates to electronic devices, such as a navigation apparatus and an audio reproducing apparatus, and a method of controlling operations thereof.

2. Description of the Related Art

An example is disclosed in Japanese Patent Laid-Open No. 2005-56150 above in which each user uses an IC (Integrated Circuit) card containing an IC chip to operate each electronic device.

Figure 8:
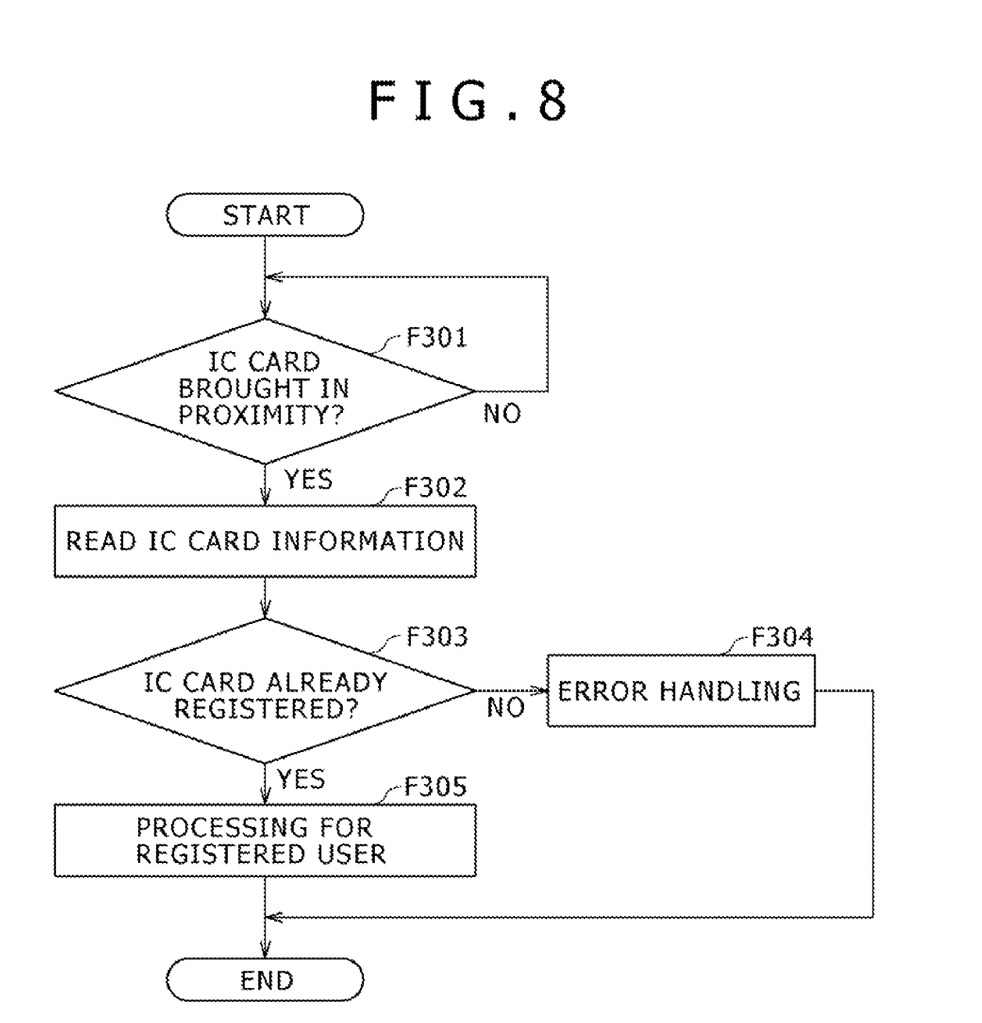
FIG. 8 is a flowchart indicative of related-art processing.

Propositions have been made in which an IC card reader is arranged on each electronic device and an IC card is used to operate such electronic devices. For example, in this use form, each individual user owns his or her IC card, makes communication between the IC card and a particular electronic device before use thereof, and has this electronic device authenticate the user. Assuming such a use form demands to register the unique identification information stored beforehand in each IC card into each electronic device. A flowchart shown in FIG. 8 is indicative of a procedure of processing to be executed by a control block of each electronic device when the user wants to use the electronic device by use of the IC card.

The electronic device has a reading block configured to read unique identification information stored in the IC card. When using the IC card, the user first brings the IC card close to the reading block. When the IC card gets in a certain proximity of the reading block, the control block determines in step F301 whether the card itself has gotten in the proximity of the reading block. If the IC card is found by the control block to be in the proximity of reading block, then the procedure goes to step F302, in which the control block reads the unique identification information from the IC card.

Figure 9:
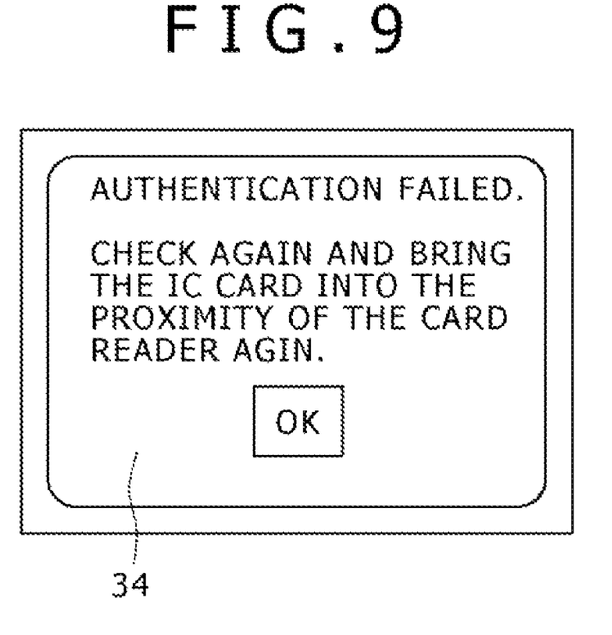
FIG. 9 illustrates a related-art error handling screen.

Having read the identification information in step F302, the procedure goes to step F303, in which the control block determines whether the identification information read from the IC card is the identification information already registered. If the identification information read from the IC card is found to be not registered, namely, if the identification information read from the IC card may not be recognized upon read error or has not been registered, then the procedure goes to step F304, in which the control block displays an error handling screen 34 shown in FIG. 9.

On the other hand, if the identification information is found registered in step F303, then the procedure goes to step F305, in which the control block executes authentication and setting processing as the processing for the registered user information. Thus, an operation by the apparatus for recognizing registered identification information comes to an end and the control block executes a device operation corresponding the registered user.

Figure 10:
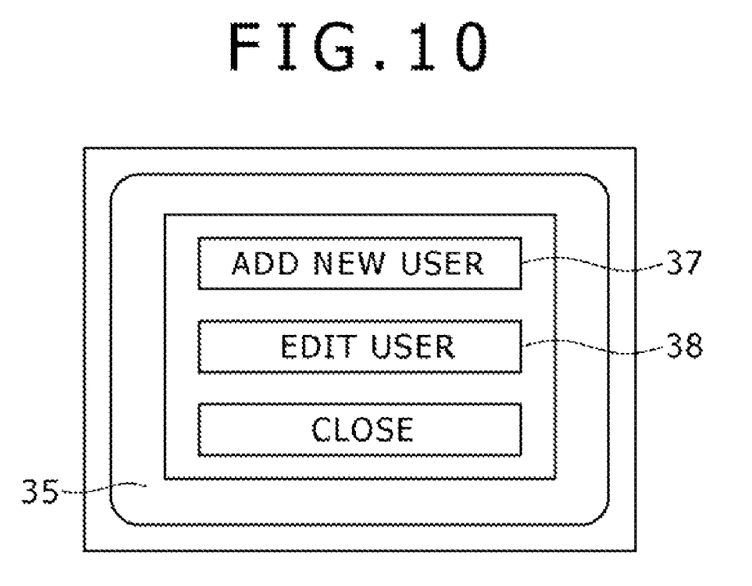
FIG. 10 illustrates a related-art editing screen.

For each new user to register an IC card (namely, the identification information stored therein) of the user or for each user having the IC card with the identification information thereof registered to edit the contents of registration, an edit screen 35 shown in FIG. 10 must be called through which to execute operations corresponding to a job to be done by the user. When the user operates a new user add button 37 on the edit screen 35, the control block displays a new user registration screen, not shown, thereby executing processing in accordance with the operation done by the user. Further, when the user who has already registered the identification information (or the ID card) wants to edit registration information, the user operates a user edit button 38, in which the control block displays a registration information edit screen, not shown, thereby executing edit processing on the displayed registration information edit screen in accordance with the user operation done.

It should be noted that, for the user to be able to execute an operation for displaying the edit screen 35 shown in FIG. 10, an icon, for example, for calling the edit screen 35 may be set to a menu screen or a screen that is displayed when processing shown in FIG. 8 is executed.

SUMMARY OF THE INVENTION

However, with electronic devices supposed for use of IC cards as described above, registering new IC cards (or the unique identification information stored in each IC card) into these electronic devices or editing the registration information of already registered identification information demands the user to execute an operation for calling a screen for new registration or editing before executing predetermined operations in accordance with the displayed screen. It takes time for the user to execute this screen calling operation and some users may be at a loss how to execute this screen calling operation to begin with, thereby being unable to effectuate the use of IC cards.

Therefore, the present invention addresses the above-identified and other problems associated with related-art methods and apparatuses and solves the addressed problems by mitigating the user load to enhance the usability of electronic devices based on noncontact-type communications devices, such as IC cards, without demanding the user to execute an operation that takes time and labor in newly registering identification information and editing the contents of registration, for example.

In carrying out the invention and according to one embodiment thereof, there is provided an electronic device. This electronic device has a reader configured to read information from a noncontact-type communications device storing unique identification information; and a controller configured to determine whether the identification information read by the reader is already registered or not yet registered and, if the identification information is found already registered, get user setting information corresponding to the identification information to execute setting processing on the basis of the user setting information and, if the identification information is found not yet registered, execute processing for registering the identification information.

If the reader reads substantially the same identification information as identification information corresponding to certain user setting information in a state in which the electronic device is operating in a setting state based on the certain user setting information, the controller executes processing for editing registration information corresponding to the identification information.

It should be noted that the registration information herein denotes information uniquely registered for each individual noncontact-type communications device (or each individual user having a noncontact-type communications device), such as card ID, code number, and user setting information.

The above-mentioned electronic device further has a display block on which the controller displays a registration screen as the processing for registration.

The above-mentioned electronic device still further has a display block on which the controller displays an editing screen as the processing for editing the identification information.

The above-mentioned noncontact-type communications device is an integrated circuit card in which an integrated circuit chip having a noncontact-type communications circuit is incorporated.

The above-mentioned electronic device is a navigation apparatus or an audio reproducing apparatus, for example.

In carrying out the invention and according to another embodiment thereof, there is provided an operation control method for an electronic device having a reader for reading information registered in a noncontact-type communications device storing unique identification information. This operation control method has the steps of: determining whether the identification information read by the reader has been already registered or not yet registered; obtaining, if the identification information is found already registered, user setting information corresponding to the identification information to execute setting processing based on the user setting information; and executing, if the identification information is found not yet registered, processing for registering the identification information.

In application to a navigation apparatus or an audio reproducing apparatus, a noncontact-type communications device, such as an IC card for example, is brought into the proximity of the card reader of the apparatus to read identification information. Consequently, control operations according to the read identification information, such as displaying a registration screen for registering the identification information of a new user and an editing screen for editing registered identification information, can be executed automatically.

As described and according to the invention, when identification information is read from a noncontact-type communications device, such as an IC card, the electronic device executes the processing of registration or editing in accordance with a condition determined from that read identification information. For example, the electronic device displays a registration screen or an editing screen depending on the read identification information. Namely, executing the processing of displaying appropriate screens in accordance with the situation and usage condition of the IC card owned by the user eliminates the necessity for the user to execute registration and editing operations. This novel configuration enhances the ease of use of electronic devices that are used based on a noncontact-type communications device.

DETAILED DESCRIPTION OF THE PREFERRED EMBODIMENTS

This invention will be described in further detail by way of embodiments thereof with reference to the accompanying drawings. The description will be made for a navigation apparatus practiced as a first embodiment of the invention and an audio reproducing apparatus practiced as a second embodiment of the invention.

Figure 1:
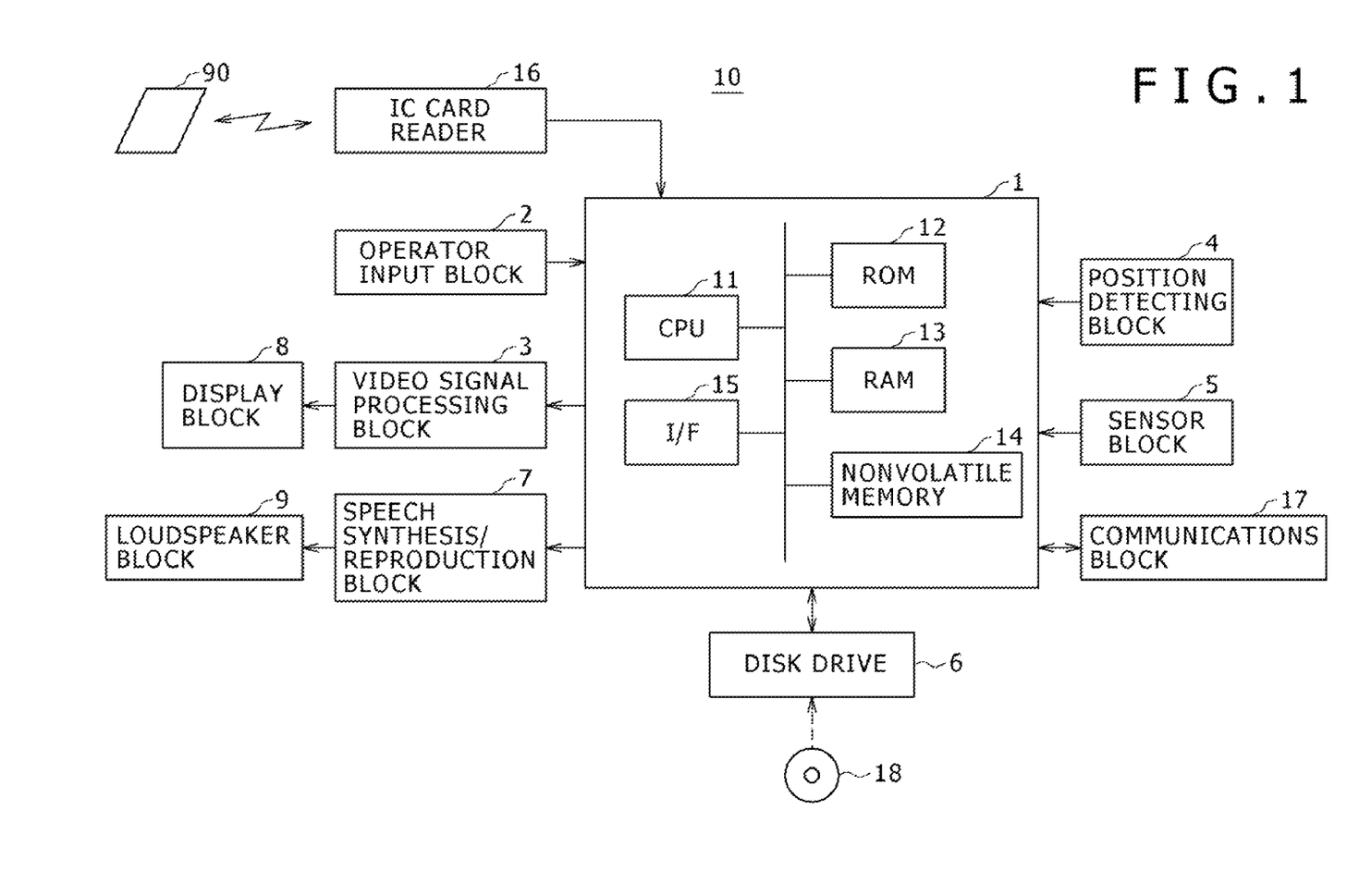
FIG. 1 is a block diagram illustrating a navigation apparatus practiced as a first embodiment of the invention.

Now, referring to FIG. 1, there is shown a block diagram illustrating a navigation apparatus 10 of the first embodiment.

The navigation apparatus 10 has an ALU (Arithmetic and Logical Unit) 1, an operator input block 2, a video signal processing block 3, a position detecting block 4, a sensor block 5, a disk drive 6, a speech synthesis/reproduction block 7, a display block 8, a loudspeaker block 9, an IC card reader 16, and a communications block 17. These component blocks may be integrally arranged in one unit or discretely in separate units communicably interconnected in a wired or wireless manner.

It should be noted that this navigation apparatus 10 is described herein as a navigation apparatus fixedly arranged on an automobile for example; however, it is also practicable to use the navigation apparatus 10 as a portable navigation apparatus.

The operator input block 2 accepts an operation done by the user and transmits the information about this operation to the ALU 1. For example, the operator input block 2 is implemented by various controls, such as keys, a jog dial, and stick, arranged on a panel of the main housing of the navigation apparatus 10 and a remote controller separately arranged from the main housing.

The operator input block 2 may also be implemented by a touch panel on the display monitor. In this case, the operator input block 2 is arranged integrally with the display block 8. Further, it is also practicable, as one form of the operator input block 2, for the operator input block 2 to be implemented by clicking menu images and icons displayed on the display block 8 with a pointing device, such as a mouse.

The display block 8 and the loudspeaker block 9 provide an output device block for outputting images and sound to the user.

The display block 8 displays various navigation images, such as map images, route guide images, operation menus, icons, POI (Point Of Interest) information, search lists, generated by the ALU 1 in the processing for navigational operations. The display block 8 also displays images to be registered and edited of unique to user information.

The video signal processing block 3 executes necessary processing on the navigation image data and other image data generated by the ALU 1 and displays the resultant data on the display block 8.

The loudspeaker block 9 outputs sound based on the processing by the ALU 1 for navigational operations and other sounds.

The speech synthesis/reproduction block 7 executes speech synthesis for outputting navigation voice and guide voice based on route guide processing, for example, and other speech synthesis processing and outputs the synthesized voice through the loudspeaker block 9.

The position detecting block 4 detects a position of the navigation apparatus 10, namely, a position of an automobile on which the navigation apparatus 10 is installed. The position detecting block 4 is a GPS (Global Positioning System) device, for example. As is well known, the GPS receives radio waves from a plurality of GPS satellites to compute a position from these satellites, thereby obtaining the longitude and latitude of the position as the position on map of the automobile.

The position detecting block 4 supplies the information of the obtained latitude and longitude representative of the position of the automobile to the ALU 1.

The sensor block 5 detects the running conditions and behaviors, for example, of the automobile. For example, the sensor block 5 includes a speed sensor for detecting the rotational speed of wheel, a vibration gyro sensor for detecting rotational angular velocity, an acceleration sensor for detecting the acceleration of the automobile, and a vibration sensor for detecting the vibration of the automobile. Also, the sensor block 5 is supposed to include sensors for detecting the conditions of automobile's running operation devices, such as a parking brake switch, a brake light switch, a steering rudder angle sensor, and a throttle sensor.

The detection information generated by the sensor block 5 is supplied to the ALU 1. The ALU 1 can use both the detection information from the sensor block 5 and the positional information from the position detecting block 4 to execute precision automatic positional detection.

The disk drive 6 is a reproducing apparatus for reproducing a disk 18 that is an external recording media based on CD (Compact Disc) scheme, DVD (Digital Versatile Disc) scheme, or Blu-ray Disc (Registered Trademark of Sony Corporation) scheme, for example.

When the disk 18 to which navigation information including map data is loaded on the disk drive 6, the navigation apparatus 10 can read the navigation information, thereby executing the navigation processing based on map data and so on.

It should be noted that term "navigation information" as used herein generically denotes the data for use in navigation processing. This navigation information includes map data, map drawing data including map images and map icons for generating map images, route computation data, route guidance data, POI data, search data, and management data. POI data includes various point-of-interest information, such as restaurants, stores, sport facilities and amusement facilities, and provides the information in which these various kinds of point-of-interest information are categorized for easy search.

Generally, with automobile navigation apparatuses, a navigation operation is executed in which the user sets a destination, a suitable route to the destination is computed, and the computed route is displayed on a map displayed on the display block. This navigation operation first demands the user to enter a destination. The entry of a destination may be made in a variety of manners including the entry of the address or geographical name of a destination, the specification of a position on the map, and the selective retrieval of a destination. For the selective retrieval of a destination, the POI input scheme is known. For example, in accordance with a user operation, a search is made on a database in which positional information as POI data is classified by category for example, and a search result is displayed in the form of a list. Then, the user specifies one of the listed entries to register the specification as a destination. The user entry for searching includes various forms, such as specifying a category in a menu format for example to make searching by use of the specified category as a key and entering a character string providing a key by the user to make searching on the basis of this key.

The disk drive 6 may be either integrally arranged with the main housing of the ALU 1 or separately arranged but communicably with the ALU 1 in a wired or wirelessly manner.

For the convenience of description, the disk 18 is a CD or a DVD as an example of an external recording media to be reproduced; however, it is also practicable to use other portable recording media as an external recording media, such as an optical disk, a magneto-optical disk, or a memory card. In this case, a reproducing apparatus compliant with each type of external recording media used is arranged. It is also practicable to use a disk drive 6 as a HDD (Hard Disk Drive).

The IC card reader 16 reads unique identification information from an IC (Integrated Circuit) card 90. The IC card 90 is a card in which an IC chip having a non-contact communications circuit is incorporated. The identification information unique to this IC chip is also stored in the IC card 90.

The IC card reader 16 starts communicating with the IC card 90 when the IC card 90 is brought into the proximity of the IC card reader 16, thereby reading the identification information from the IC chip incorporated in the IC card 90. Then, the IC card reader 16 supplies the read identification information to the ALU 1.

The IC card 90 is a non-contact communications device owned by the user of the navigation apparatus 10, for example. In this case, for the navigation apparatus 10, the identification information stored in the IC card 90 is the information for identifying each individual user.

The IC card reader 16, formed separately from the navigation apparatus main that includes the ALU 1, may communicate in a wired or wireless manner or be arranged inside the navigation apparatus main.

The communications block 17 communicates with an information server via a mobile phone network or another wireless network. By the communication with a predetermined information server through the communications block 17, the ALU 1 can get information about road and traffic conditions, for example.

The ALU 1 executes computational processing necessary for navigation and has a CPU (Central Processing Unit) 11, a ROM (Read Only Memory) 12, a RAM (Random Access Memory) 13, a nonvolatile memory 14, and an interface block 15.

The ROM 12 stores an operation program, constants for use in various processing operations, and fixed information. It should be noted that the operation program may alternatively stored in the disk 18 loaded on the disk drive 6 to be loaded into the ALU 1 every time the navigation apparatus 10 is started.

The RAM 13 provides a work area, a program load area, and a temporary information storage area. The RAM 13 also provides a temporary area for buffering data read by the disk drive 6 and for data processing.

The nonvolatile memory 14 is rewritable and can hold data stored therein after the power to the system is disrupted. The nonvolatile memory 14 can be implemented by a flash memory, for example. It is also practicable to use an SRAM (Static Random Access Memory), for example, that is battery backed, for the nonvolatile memory 14. The nonvolatile memory 14 stores coefficients for use in various processing operations, user-registered information, user-specified route information, and past travel log information, for example.

In addition, in the present embodiment, the nonvolatile memory 14 is also used to store registration information as will be described with reference to FIG. 2.

The CPU 11 executes various control operations in accordance with the identification information read by the IC card reader 16, in addition to various control operations as the navigation apparatus. The processing to be executed in accordance with identification information includes the new registration of users and the editing of registration information, for example.

Further, the CPU 11 executes information processing and control processing that are necessary as the navigation apparatus on the basis of programs stored in the ROM 12. For these information processing and control processing, the CPU 11 uses the RAM 13 as a work area and references the information stored in the ROM 12 and the nonvolatile memory 14.

The interface block 15 provides interface between the ALU 1 and other component blocks, namely, the operator input block 2, the video signal processing block 3, the position detecting block 4, the sensor block 5, the disk drive 6, the speech synthesis/reproduction block 7, the IC card reader 16, and the communications block 17. The interface block 15 receives operation information and various kinds of input information through the operator input block 2 and positional information from the position detecting block 4, and detection information from the sensor block 5, transmitting these received items of information to the CPU 11. Also, the interface block 15 supplies the control information, image data, and audio data outputted from the CPU 11 to the video signal processing block 3 and the speech synthesis/reproduction block 7, thereby making these blocks execute the display output and audio output necessary as the navigation system. Further, the interface block 15 transmits an access request from the CPU 11 to the disk drive 6 transmits an access request from the CPU 11 to the disk drive 6, thereby making the disk drive 6 execute predetermined data reproduction. Still further, the interface block 15 captures the navigation information transmitted from the disk drive 6 as a result of a reproducing operation into the ALU 1. In addition, the interface block 15 transmits the user identification information read by the IC card reader 16 to the CPU 11. Also, the interface block 15 executes a data transfer operation for the data communication to be executed by the communications block 17.

Figure 2:
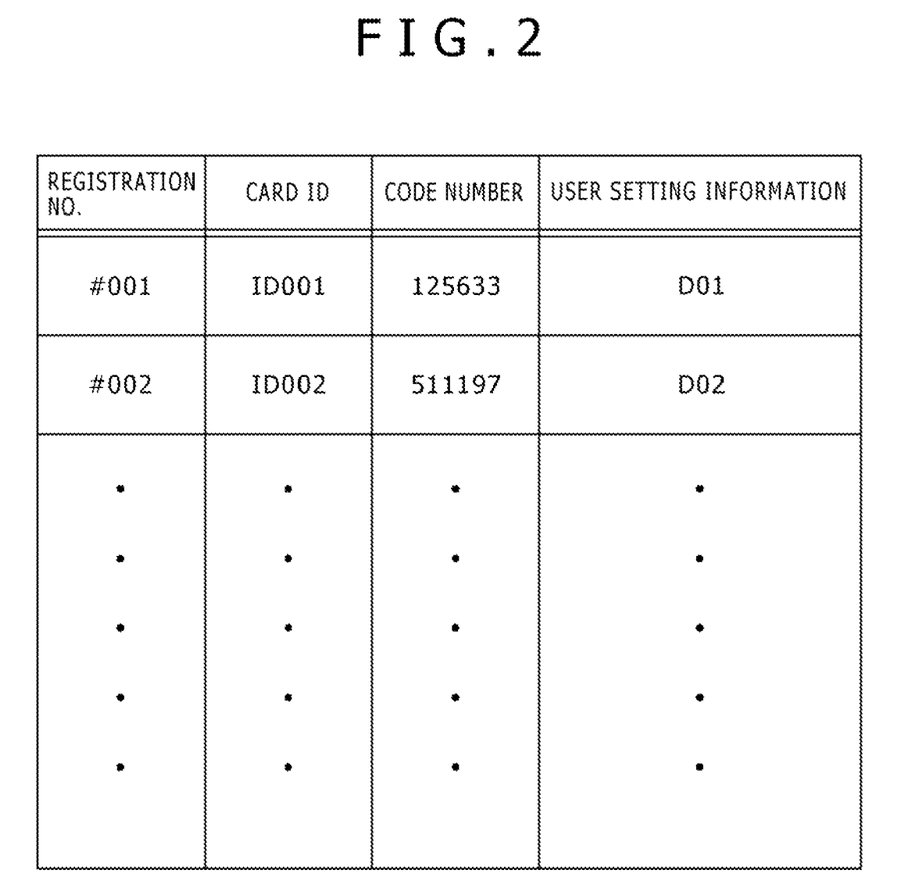
FIG. 2 is a registered user setting table according to the first embodiment.

Referring to FIG. 2, there is shown an exemplary registered user setting table that lists card ID, code number, and user setting information as the registration information to be uniquely set to each user having an IC card.

This registered user setting table is stored and updated in the nonvolatile memory 14 for example.

The registered user setting table stores registration information by registration number (#001, #002, . . . ) for example.

The registration information (card ID, code number, and user setting information) to be registered for each registration number provides the information corresponding to one IC card 90. For example, the card ID, code number, and user setting information to be stored as registration number #001 for example are the registration information stored for the IC card 90 owned by user X and the card ID, code number, and user setting information to be stored as registration number #002 for example are the registration information stored for the IC card 90 owned by user Y.

Of the registration information to be stored as described above, the card ID (ID001, ID002, . . . ) denotes unique identification information stored in each IC card 90.

The code number denotes a number arbitrarily defined by the user for each IC card 90. Numbers 125633, 511197, . . . in the code number column in FIG. 2 are indicative of code numbers registered in the navigation apparatus 10.

The user setting information D(x) (D01, D02, . . . ) denotes the setting information unique to each user; in this embodiment, the user setting information denotes the information stored for each user, such as the operation mode, operation environment, and display contents such as map display of the navigation apparatus 10.

To be more specific, the user setting information includes icons to be displayed on the map when displaying maps as a navigational operation, settings of types of map symbols, POI information, contents and design of menu screen, log information about destinations and routes, and other information that is determined in accordance with user preference and selection or use logs.

Namely, when setting of the navigation apparatus 10 is executed by each user on the basis of the above-mentioned user setting information, a user interface suitable for that user with respect to display processing and operation can be realized.

It should be noted that the registered user setting table shown in FIG. 2 is added with registration information every time the registration processing is executed on the IC card 90.

For example, in the example shown in FIG. 2, when a certain user executes a registration operation for a new (unregistered so far) IC card 90, the CPU 11 stores, on the registered user setting table, the card ID, code number, and user setting information of the newly registered ID card for registration number #003. In this case, the card ID is the identification information read from the IC card 90 to be registered this time. The code number is an arbitrary number entered by the user at registration.

It should be noted that the user setting information may be a default setting status of the apparatus at the time of registration instead of the information of the operating environment and operation mode, for example, selected by the user. If the default setting is used, the operation environment setting, such as operation mode, operation environment, and display contents, unique to the user having the IC card 90 may be additionally registered by learning every time a log-in operation (to be described later) is executed by use of the IC card 90.

Storing this registered user setting table in the nonvolatile memory 14 allows the CPU 11, when the user brings the IC card 90 into the proximity of IC card reader 16, to search the registered user setting table on the basis of the read card ID to retrieve the user setting information D(x) corresponding to that user (IC card 90). It should be noted that if the user has entered the code number through the operator input block 2 instead of using the IC card 90, the CPU 11 also searches the registered user setting table on the basis of the IC card number to retrieve the user setting information D(x) corresponding to the that user.

Figure 3:
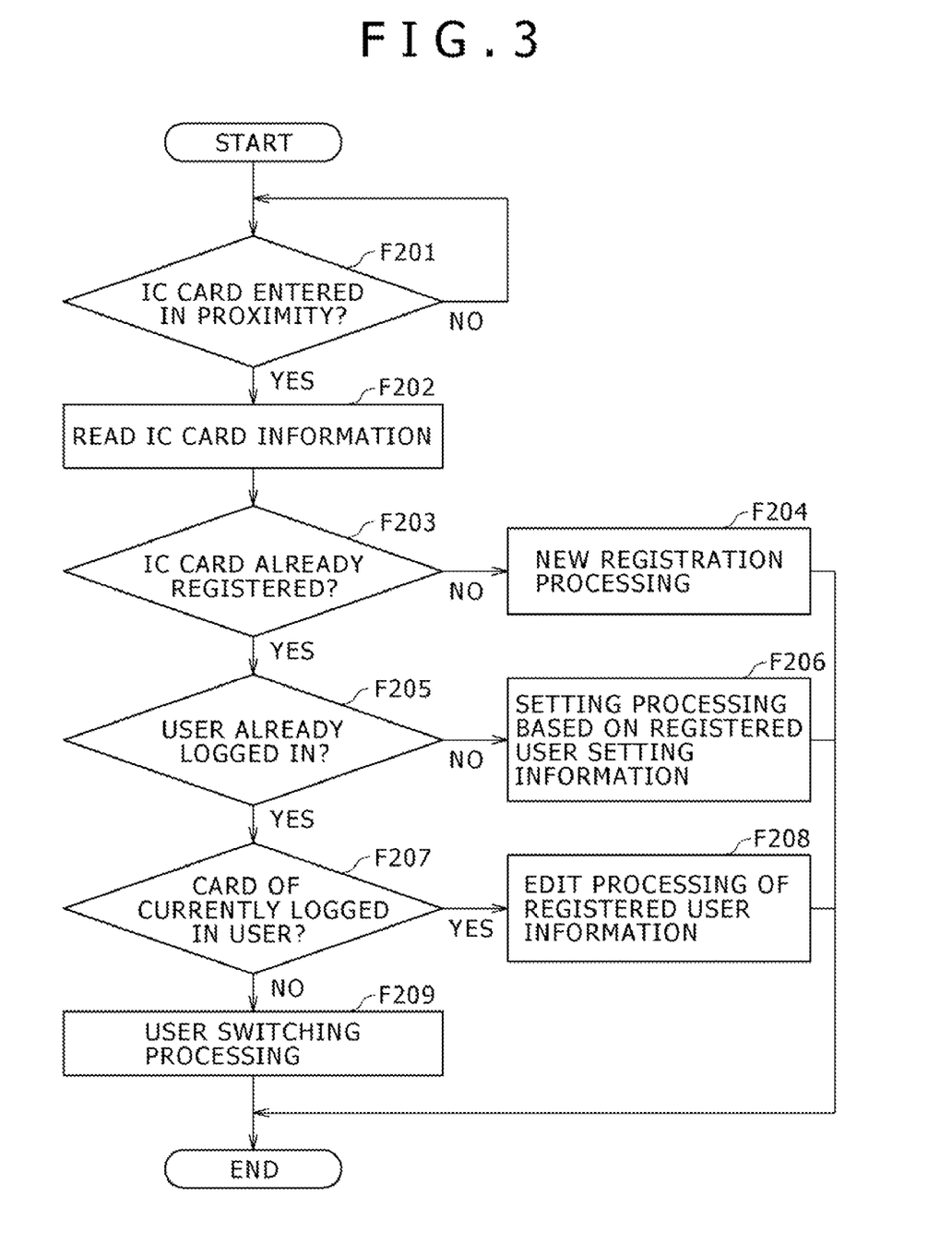
FIG. 3 is a flowchart indicative of processing according to the first embodiment of the invention.

The following describes the processing of the CPU 11 to be executed when the user brings his or her IC card 90 into the proximity of the IC card reader 16 of the navigation apparatus 10 having the above-mentioned configuration, with reference to FIG. 3.

It should be noted that, basically, the user uses the IC card 90 for the navigation apparatus 10 when the user wants the navigation apparatus 10 in a setting status suitable for the user who has registered the card ID into the registered user setting table as described above.

In step F201 of the flowchart shown in FIG. 3, the CPU 11 determines whether the IC card 90 has been brought into the proximity of the IC card reader 16, namely, whether the IC card 90 and the IC card reader 16 have become communicable with each other.

When the communication between the IC card 90 and the IC card reader 16 has been established, the CPU 11 makes the procedure go to step F202, in which a card ID read from the IC card 90 by the IC card reader 16 through communication is read.

When the card ID has been read, the CPU 11 makes the procedure go to step F203 to determine whether the captured card ID is the card ID already registered in the above-mentioned registered user setting table or the card ID not yet registered in the table. If the card ID is found not registered, the CPU 11 makes the procedure go to step F204 to execute the new registration processing of the card ID.

If the card ID is found already registered in the table, the CPU 11 makes the procedure go to step F205 to determine whether a certain user (or a certain IC card 90) has logged in the navigation apparatus 10.

Log-in denotes a status in which operation setting has been made on the basis of the user setting information of that user (or the IC card 90 owned by that user).

If the user is found not logged in (namely, currently, no one has logged in), then the CPU 11 makes procedure go to step F206 to execute the setting procedure on the basis of the user setting information registered in accordance with the card ID read this time. Namely, the CPU 11 puts the user who has used the IC card 90 this time into a logged-in status.

On the other hand, if the certain user is found logged in step F205, then the CPU 11 makes the procedure go to step F207 to determine whether the card ID read this time is the same card ID as the card ID of the currently logged-in user. Namely, the CPU 11 determines whether the user already logged in has brought the IC card 90 into the proximity of the IC card reader 16 again.

If the card ID read this time is found to be the same as the card ID of the currently logged-in user, the CPU 11 makes the procedure go to step F208 to edit the registration information of the currently logged-in user.

If the card ID read this time is found to be different from that card ID of the currently logged-in user, then it indicates that a user different from the user logged-in so far (or a different IC card 90) has come in the proximity of the IC card reader 16, so that the CPU 11 makes the procedure go to step F209 to switch to a new user. Namely, the CPU 11 switches the current setting status to a setting status based on the user setting information registered in accordance with the card ID stored this time. Consequently, the user logged in so far is switched to the user who has used the IC card 90 this time.

When communication is executed as a result of bringing the IC card 90 into the proximity of the IC card reader 16, the CPU 11 executes this processing shown in FIG. 3 as described above.

The following describes exemplary operations of the above-mentioned cases shown in FIG. 3. In what follows, the description will be made by assuming that users (D, C, B, and A) have each IC card 90 of his or her own and use the IC card 90 in situations (1) through (4) below.

(1) User D whose IC card 90 has already been registered in the registered user setting table uses the IC card 90 when no other users has been logged in on the navigation apparatus 10.

(2) User C whose IC card 90 has already been registered uses the IC card 90.

(3) User B whose IC card 90 has already been registered uses the IC card 90 when user A logged in on the navigation apparatus 10.

(4) User A whose IC card 90 has already been registered uses the IC card 90 again after logging in on the navigation apparatus 10 on its own.

The following describes the case of (1) in which User D whose IC card 90 has already been registered in the registered user setting table has uses IC card 90 when no other users has been logged in on the navigation apparatus 10.

If user D brings the IC card 90 into the proximity of the IC card reader 16 in such a situation, the CPU 11 determines in step F203 that the card ID that has been read has already been registered in the registered user setting table. At this moment, because no one has logged in on the navigation apparatus 10, the CPU 11 makes the procedure go from step F205 to F206.

Then, in step F206, the setting processing is executed in accordance with the registered user setting information. Namely, this is the log-in processing on user D (namely, the IC card 90 owned by user D). To be more specific, in step F206, the CPU 11 reads the user setting information unique to user D registered in correspondence with the card ID read this time from the registered user setting table stored in the non-volatile memory 14. Then, the CPU 11 sets the operation setting, the display setting, and the mode setting, for example, to the states corresponding to that user setting information, thereby making the navigation apparatus 10 to be ready for the easy use for user D.

Figure 5A:
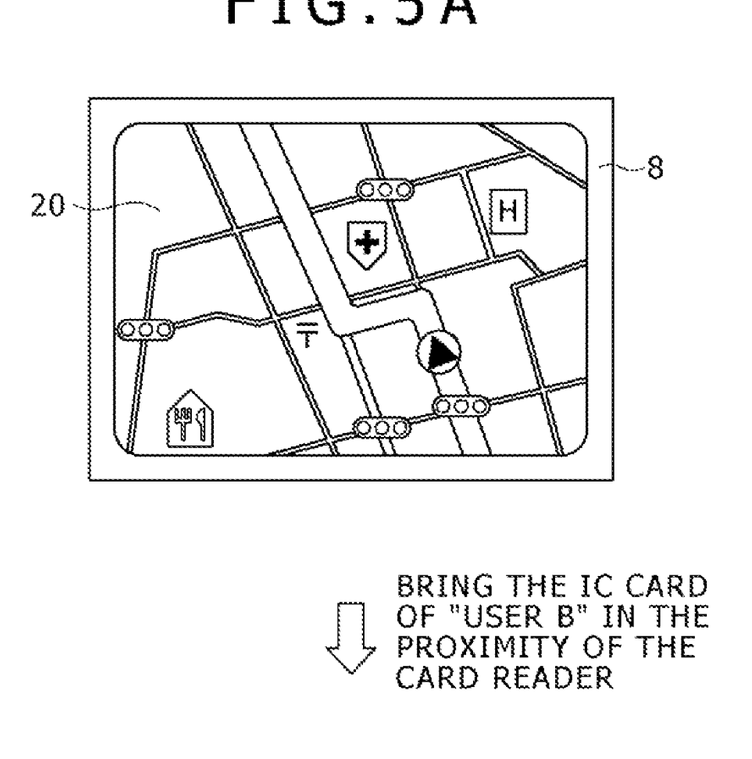
FIGS. 5A and 5B illustrate user switching processing screens practiced as the first embodiment.
Figure 5B:
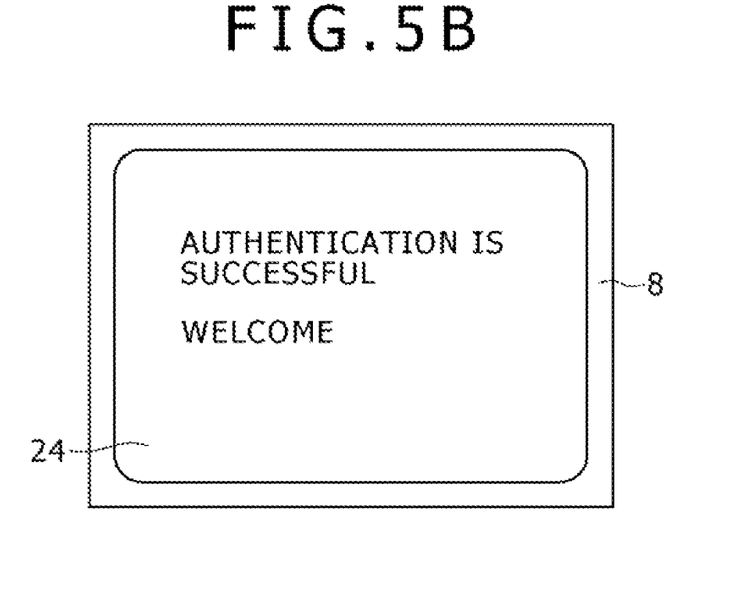

It should be noted that, at this moment, a log-in complete screen (for user authentication) as shown in FIG. 5B, for example, is displayed for several seconds, telling user D that the log-in operation has been completed.

The following describes the case in which user C whose IC card 90 has not been registered uses the IC card 90 on the navigation apparatus 10 as shown in (2) above.

When the user brings the IC card 90 into the proximity of the IC card reader 16, the CPU 11 determines in step F203 that the card ID that has been read is not registered in the registered user setting table. Therefore, the CPU 11 makes the procedure go to step F203 to step F204 to execute new registration processing while displaying various registration screens.

FIG. 4 shows an exemplary screen to be displayed by the CPU 11 onto the display block 8 in new registration processing in step F204.

Figure 4A:
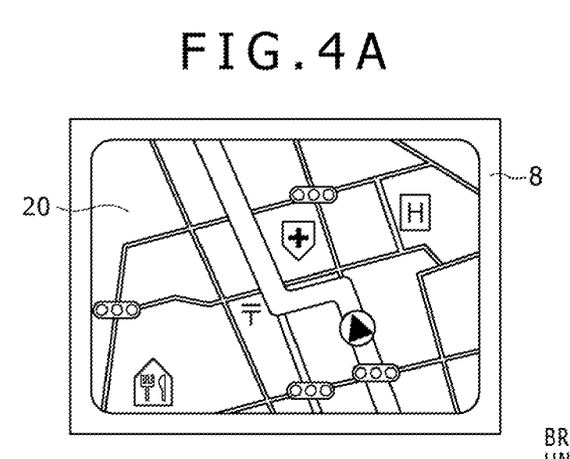
FIGS. 4A, 4B, 4C, and 4D illustrate new registration processing screens practiced as the first embodiment of the invention.

First, FIG. 4A shows a status in which a navigation screen 20 is normally shown on the display block 8. It should be noted that a navigation screen as shown in FIG. 4A may be displayed when another user has been logged in or no user has been logged in.

For example, assumed that user C use the IC card 90, upon which the CPU 11 makes the procedure go to step F204.

Figure 4B:
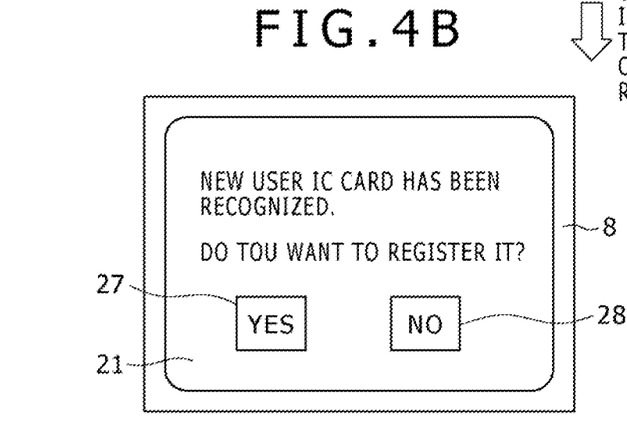

Then, the CPU 11 displays a registration confirmation screen 21 on the display block 8 as one of registration screens as shown in FIG. 4B.

When the user operates a NO button 28 is operated by the user in the registration confirmation screen 21, the CPU 11 determines that the user has selected not to register the read card ID. In this case, the displaying of the registration confirmation screen 21 is ended, upon which the new registration processing is ended.

On the other hand, if a YES button 27 is operated by the user in the registration confirmation screen 21 shown in FIG. 4B, then the CPU 11 determines that the registration of the read card ID has been requested by the user. Then, the CPU 11 ends the displaying of the registration confirmation screen 21 and displays a code number setting screen 22 as shown in FIG. 4C onto the display block 8.

Figure 4C:
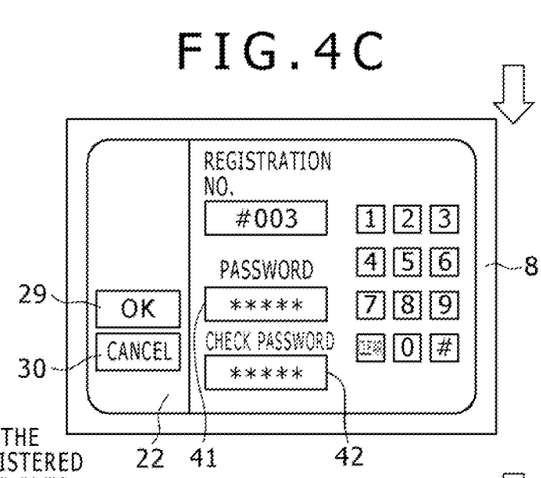

In response to an entry by the user through the code password screen 22 shown in FIG. 4C, the CPU 11 determines a code number to be registered. The user enters a user-specified password by operating numeric keys arranged on the password setting screen 22 into an input box 41 and input check box 42. When the necessary numbers have all been entered, the user operates an OK button 29.

In response to the operation by the user, the CPU 11 checks the number display in the input box 41 and the input check box 41 and the enter operation effected by the OK button 29. Then, when the OK button 29 is clicked, the CPU 11 establishes the code number.

When the code number has been established, the CPU 11 additionally registers, as a pair of registration information, the established code number and the user setting information into the registered user setting table stored in the nonvolatile memory 14. It should be noted that, as described above, the user setting information is default setting information at this point of time; later, user C logs in on the navigation apparatus 10 and the setting information learned from the use of the navigation apparatus 10 may be added as the setting information. Alternatively, subsequent to the displaying of the password setting screen 22 shown in FIG. 4C, a screen may be displayed for prompting the user to select user-desired display setting, preferences, and operation environment setting, for example, thereby accordingly generating and registering the resultant user setting information.

Figure 4D:
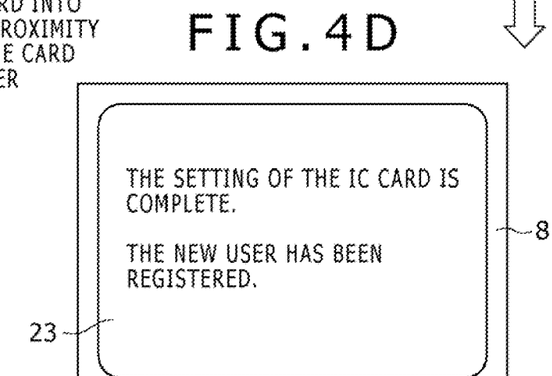

When the registration processing has been thus completed for user C (or the IC card 90 owned by user C), the CPU 11 displays a user registration completion screen 23 as shown in FIG. 4D for several seconds.

It should be noted that if a CANCEL button 30 is operated in the input screen for new registration as with the password setting screen 22 shown in FIG. 4C, the CPU 11 determines that the user has canceled the registration processing and therefore ends the new registration processing with the user left unregistered.

It should be noted that the operation of each button shown in FIG. 4 may be executed through keys, the jog dial, the stick, the touch panel, the keyboard, or the mouse arranged on the operator input block 2. This holds the same with buttons on screens shown in FIGS. 5 and 6.

The following describes the case in which user B whose IC card 90 has been registered uses the IC card 90 when user A has logged in on the navigation apparatus 10 as shown (3) above.

When user B brings the IC card 90 into the proximity of the IC card reader 16 in this status, the CPU 11 determines in step F203 that the read card ID has already been registered in the registered user setting table. Because user A has already logged in at this point of time, the CPU 11 makes the procedure go from step F205 to step F207. Further, because the card ID read this time is the card ID of the IC card 90 owned by user B and therefore different from the card ID of the IC card 90 owned by user A, the CPU 11 makes the procedure go to step F209.

In step F209, the setting processing is executed on the basis of the user setting information registered in step F209. Namely, this case is the logging in for user B (or the IC card 90 owned by user B), which is processing for switching the user being logged in from user A to user B.

To be more specific, in step F209, the CPU 11 reads the user setting information unique to user B registered in correspondence with the card D read this time from the registered user setting table stored in the nonvolatile memory 14. then, the CPU 11 sets the operation setting, the display setting and the mode setting in accordance with the user setting information of user B of this time from the setting status of current user A, thereby making the navigation apparatus 10 ready for easy use by user B.

For example, a screen shown in FIG. 5A is indicative of a status in which the navigation screen 20 is displayed on the display block 8 with user A logged in.

When user B brings the IC card 90 into the proximity of the IC card reader 16 with user A logged in, the CPU 11 ends the displaying of the navigation screen 20 with user A already logged in, thereby changing the setting in accordance with the user setting information of user B as described above. In this case, the CPU 11 displays a user authentication completion screen 24 as shown in FIG. 5B that is a log-in completion (or user authentication completion) screen onto the display block 8 for several seconds, thereby notifying the user of the completion of the log-in operation (in this case, the switching between log-in users).

Subsequently, the navigation screen 20 shown in FIG. 5A is displayed. In this case, the navigation screen is displayed with a display status and display contents suitable for user B. For example, the map symbols, icons, and operation guide are suited for user B.

The following describes the case in which user A whose IC card 90 has already been registered uses the IC card 90 again after logging in on the navigation apparatus 10 on his or her own.

When user A brings the IC card 90 into the proximity of the IC card reader 16 after having been logged in, the CPU 11 makes the procedure go from step F203 to step F205 to step F207 because the read card ID has already been registered in the registered user setting table and user A has been logged in at this point of time. Because the card ID read this time is the same as the card ID of the IC card 90 of logged-in user A, the CPU 11 makes the procedure go to step F208.

In step F208, the CPU 11 determines that the log-in user has brought the IC card 90 into the proximity of the 16 again because the log-in user wants to edit the contents of the registration, thereby editing registration information by displaying necessary edit screens.

Figure 6A:
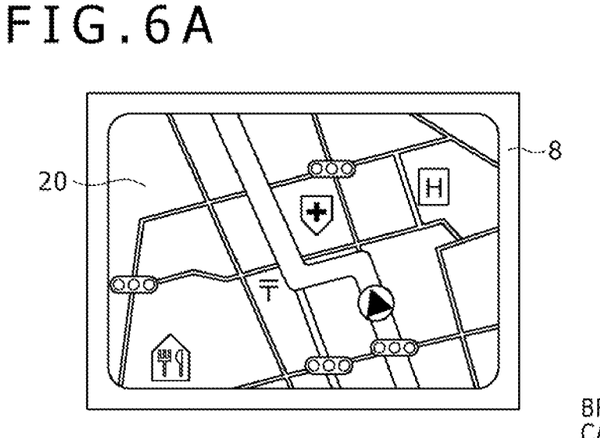
FIGS. 6A, 6B, and 6C illustrate registration information editing screens practiced as the first embodiment of the invention.
Figure 6B:
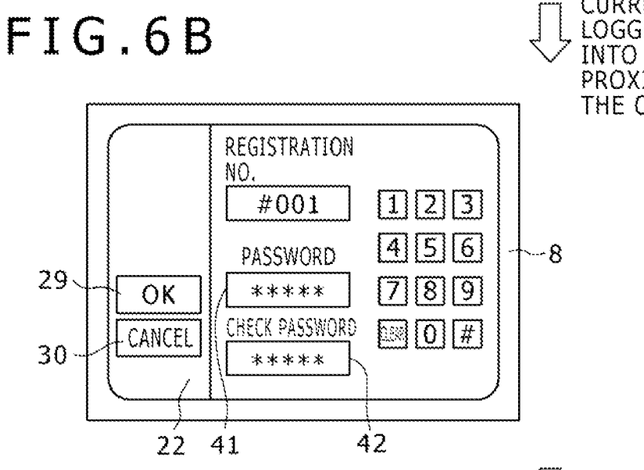
Figure 6C:
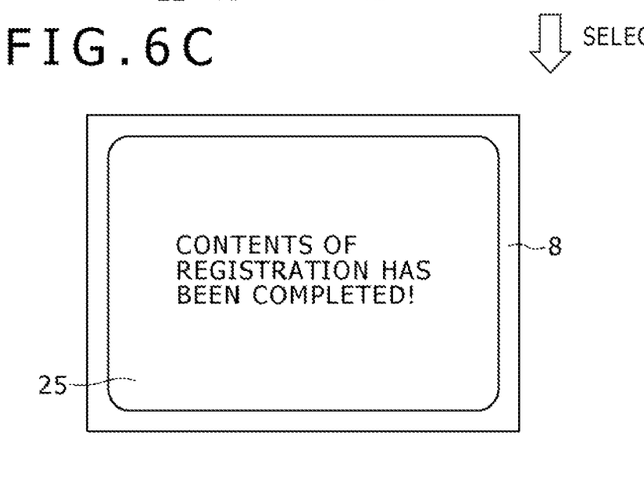

FIG. 6 shows exemplary screens to be displayed by the CPU 11 onto the display block 8 in the edit processing in step F208.

A screen shown in FIG. 6A is indicative of a status in which the navigation screen 20 is displayed on the display block 8 with user A logged in.

For example, assume that user A use the IC card 90 and the CPU 11 make the procedure go to step F208 in this status.

Then, if a code number change is executed for the editing of registration information, for example, the password setting screen 22 as shown in FIG. 6B is displayed on the display block 8 as one of the editing screens.

In response to each entry by the user into the password setting screen 22 shown in FIG. 6B, the CPU 11 edits (or updates) the code number. The user operates numeric keys displayed on the password setting screen 22 to enter a given password into the input box 41 and the input check box 42. Then, the user operates the OK button 29.

In response to the operation by the user, the CPU 11 checks the numbers entered in the input box 41 and the input check box 42 and the operation of the OK button 29. Then, when the OK button 29 is clicked, the CPU 11 establishes a new code number.

When the new code number has been established, the CPU 11 updates the code number stored in the registered user setting table in accordance with the card ID read this time.

When the edit processing has been completed, the CPU 11 displays an edit completion screen 25 as shown in FIG. 6C onto the display block 8 for several seconds.

It should be note that, if the CANCEL button 30 is operated in an edit input screen, such as the password setting screen 22 shown in FIG. 6B, for example, the CPU 11 regards that the user has canceled the edit processing and ends the edit processing without updating the contents of registration.

It should be noted that, the description above, the code number editing was used for example; obviously, it is also practicable to execute edit processing for changing the contents of user setting information. Namely, an input screen for changing the contents of user setting information may be displayed to change the user setting information in the registered user setting table in accordance with each entry done by the user.

As described above, with the navigation apparatus 10, when the IC card 90 is brought in the proximity of IC card reader 16 and the card ID is read from the IC card 90, the CPU 11 executes the processing in accordance with the registration situation and the log-in situation at that point of time. To be more specific, if a card ID not registered has been read, the CPU 11 executes new registration processing in step F204. If the user being logged in brings the IC card 90 into the proximity of the IC card reader 16 again and the same card ID as the card ID already logged in has been read, then the CPU 11 executes the processing for editing the contents of registration.

The above-mentioned configuration saves the user a cumbersome or difficult operation for introducing screens for new registration and editing and displays necessary screens in accordance with situations, thereby providing operations suitable for each user who is unaware of the situations of registration.

The following describes an audio reproducing apparatus 100 practiced as a second embodiment of the invention.

Figure 7:
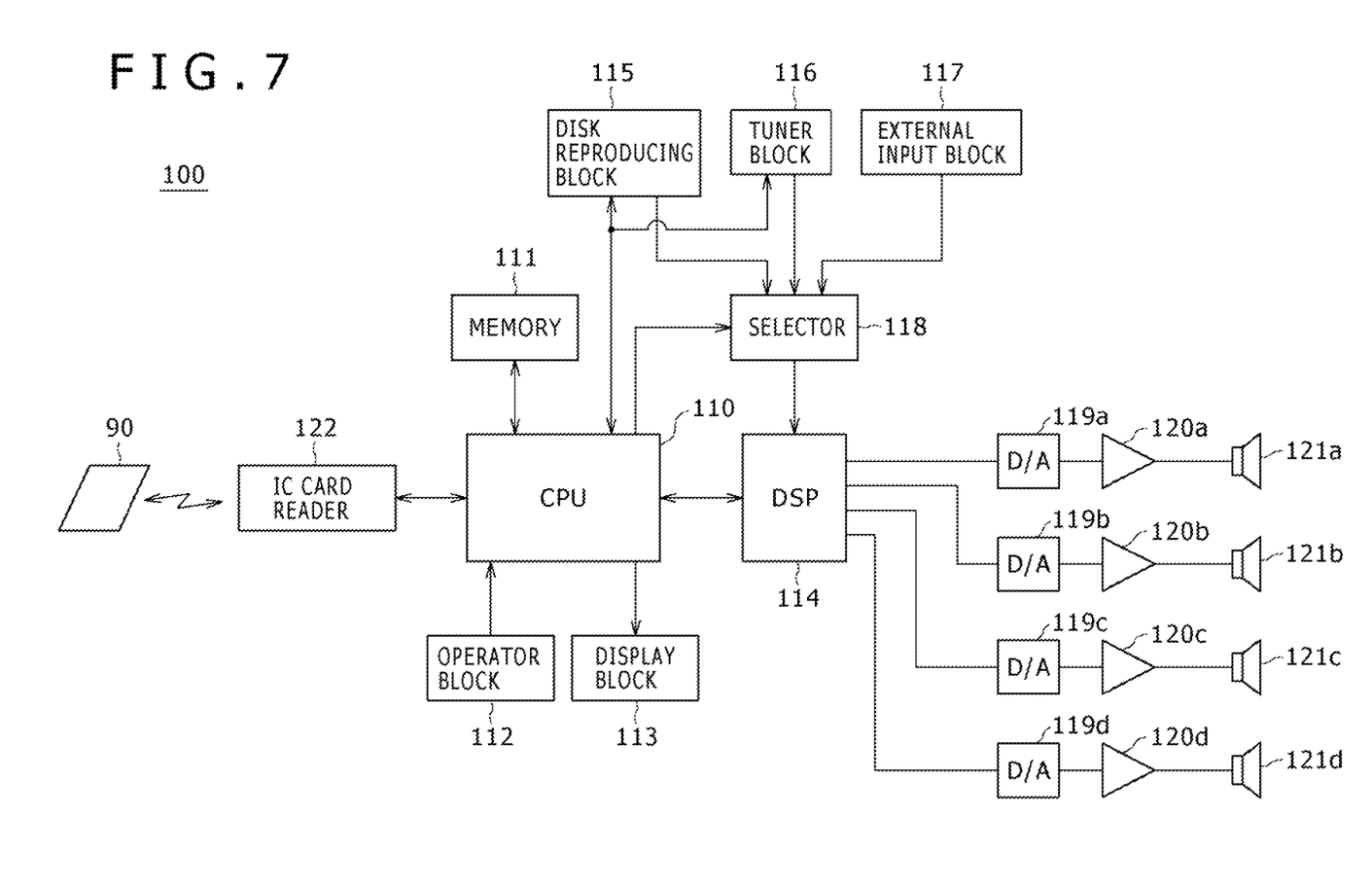
FIG. 7 is a block diagram illustrating an audio reproducing apparatus practiced as a second embodiment of the invention.

Referring to FIG. 7, there is shown an exemplary audio reproducing apparatus that is mounted on the front console of an automobile, for example.

The audio reproducing apparatus 100 has a reproducing capability of reproducing audio disks, such as CD and Mini-Disc (Trademark of Sony Corporation), and a radio tuner capability, thereby sounding reproduced audio signals, such as music, from one or more loudspeakers arranged inside automobile.

In the audio reproducing apparatus 100 shown in FIG. 7, a CPU 110 controls audio reproducing operations in accordance with an operating program and commands entered by the user and executes various processing operations, such as log-in processing for the IC card 90, new user registration, and registered information editing, for example.

A memory block 111 stores program codes to be executed by the CPU 110 and temporarily stores work data during the execution of these program codes. In the case of FIG. 7, the memory block 111 is implemented by both volatile and non-volatile memories. For example, the memory block 111 includes nonvolatile memories, such as a ROM for storing programs and a RAM and an EEPROM (Electrically Erasable and Programmable Read Only Memory) for temporarily providing a computation work area and temporarily storing various data.

Each nonvolatile memory included in the memory block 111 is also used for storing the registered user setting table shown in FIG. 2.

An operator block 112 has controls, such as keys and dials, arranged on the front panel of the audio reproducing apparatus 100. Through the operator block 112, the operator can executes operations, such as audio mode (or source) switching, volume control, tone quality control, disk reproduction, fast forward/rewind, and cueing, and radio station tuning.

A display block 113, based on an LCD (Liquid Crystal Display) panel for example, is arranged on the front panel of the audio reproducing apparatus 100. This display block 113 displays audio modes, reproduction and fast forward operations, a spectrum analyzer, a volume level, track numbers of music being reproduced, a radio station being tuned in, and screens for registering and editing user-unique information, for example, under the control of the CPU 110.

Sources of audio signals to be reproduced and outputted include a disk reproducing block 115, a tuner block 116, and an external input block 117. A selector 118 switches between these audio signal sources.

It should be noted that it is also practicable to arrange, as other audio signal sources, a HDD storing music and so on and a memory card reader for reproducing audio signals from a memory card.

The disk reproducing block 115 reproduces optical disks, such as CD and DVD, or optical disk/magneto-optical disk, such as Mini Disc, for example.

When the user issues commands associated with disk reproduction through the operator block 112, the CPU 110 causes the disk reproducing block 115 to start a reproducing operation and execute operations (cueing for example) specified by the user. When reproduction is executed in the disk reproducing block 115, the CPU 110 controls the selector 118 to select the disk reproducing block 115. An audio signal reproduced from a disk through the disk reproducing block 115 is supplied to a DSP (Digital Signal Processor) 114 through the selector 118 in the form of digital data.

The tuner block 116, a broadcast wave receiving device for receiving radio broadcasts, receives and demodulates radio waves. When the radio wave reception is executed in the tuner block 116, the CPU 110 controls the selector 118 to select the tuner block 116. An audio signal demodulated by the tuner block 116 is converted into digital data, which is supplied to the DSP 114 through the selector 118.

The external input block 117 is a circuit through which audio signals from external devices arranged inside an automobile, such as a changer system and a navigation device.

If the external input block 117 is specified by the user as an audio signal source, the CPU 110 controls the selector 118 to select the external input block 117. Then, the audio signal (digital data) entered from an external device through the external input block 117 is supplied to the DSP 114 through the selector 118.

The DSP 114 executes various signal processing operations on audio signals to be outputted. For example, the signal processing includes equalizing, reverberation, and other sound effect processing, volume control, time alignment, channel division, and loudspeaker balance control.

The volume control, the sound effect processing, and loudspeaker balance control are executed by the user through the operator block 112.

In the DSP 114, the above-mentioned various audio signal processing operations and resultant 4-channel audio signals to be sounded from 4-channel loudspeakers are outputted.

Audio signals in four channels are converted by D/A converters 119a, 119b, 119c, and 119d into analog signals, which are amplified by amplifiers 120a, 120b, 120c, and 120d to be sounded from loudspeakers 121a, 121b, 121c, and 121d. These loudspeakers 121a, 121b, 121c, and 121d are arranged inside an automobile as a front right loudspeaker, a front left loudspeaker, a rear right loudspeaker, and a rear left loudspeaker, for example.

It should be noted that the loudspeaker balance control executed in the DSP 114 denotes the processing for variably setting volume control between the front loudspeakers and the rear loudspeakers and between the right loudspeaker and the left loudspeakers, for example.

The user can set these loudspeaker balances as desired.

An IC card reader 122 reads unique identification information stored in the IC card 90.

Like the IC card reader 16 of the above-mentioned navigation apparatus 10, the IC card reader 122 makes communication with the IC card 90 when the IC card 90 is brought into proximity of the IC card reader 122, thereby reading identification information from the IC chip incorporated in the IC card 90. Then, the read identification information is supplied to the CPU 110.

The IC card 90 is a noncontact-type communications device owned by the user who uses the audio reproducing apparatus 100, for example. In this case, for the audio reproducing apparatus 100, the identification information stored in the IC card 90 identifies each individual user.

The IC card reader 122 may be either formed separately from the audio reproducing apparatus main or communicable therewith in a wired or wireless manner or arranged inside the audio reproducing apparatus main.

The processing to be executed by the CPU 110 when the user uses the IC card in the audio reproducing apparatus 100 having the above-mentioned configuration is substantially the same as described with reference to FIG. 3.

Therefore, if the CPU 110 recognizes the card ID already registered in the registered user setting table when the audio reproducing apparatus 100 is logged in by no user, a setting status is provided on the basis of the user setting information registered along with that card ID. Namely, log-in processing is executed by the CPU 110.

If the CPU 110 recognizes the card ID not registered in the registered user setting table, the CPU 110 newly registers that card ID.

Further, if the CPU 110 recognizes another registered card ID if the audio reproducing apparatus 100 is already logged in with a certain card ID, the CPU 110 executes log-in processing with that card ID, namely, log-in user switching.

If the CPU 110 recognizes that card ID again when the audio reproducing apparatus 100 is logged in with a certain card ID, the CPU 110 edits the registration information of that card ID.

Namely, in the audio reproducing apparatus 100 too, if the IC card 90 is brought into the proximity of the IC card reader 122 and the card ID is read from the IC card 90, the CPU 110 executes the processing in accordance with the situation of registration and the situation of log-in at that point of time. To be more specific, if an unregistered card ID has been read, the CPU 110 executes new registration in step F204. If the same IC card 90 is brought into the proximity of the IC card reader 122 again by the logged-in user and the same card ID as the logged-in card ID has been read, the CPU 110 edits the contents of registration.

Therefore, the above-mentioned configuration saves the user a cumbersome or difficult operation for introducing screens for new registration and editing and displays necessary screens in accordance with situations, thereby providing operations suitable for each user who is unaware of the situations of registration.

In the case of the audio reproducing apparatus 100, the user setting information may include the setting of audio source to be first selected by the selector 118 and the initial (namely, before the manual setting by the user) volume setting, sound setting including equalizing and reverberation, and loudspeaker balance setting, for example. If the sound setting to be normally used by each individual user is user setting information, then the audio reproducing apparatus 100, when a certain logs in by use of the IC card 90, determines the sound setting as the user setting information on the basis of the read card ID, thereby executing a reproducing operation with that sound setting.

Namely, each individual user may only logs in on the audio reproducing apparatus 100 by use of the IC card 90 of his or her own, thereby getting audio reproduction in a sound reproducing status suitable that user.

It should be noted that, in the above-described first and second embodiments, the registered user setting table is stored in the nonvolatile memory inside the apparatus (the nonvolatile memory 14 shown in FIG. 1 or the memory block 111 shown in FIG. 7); however, it is also practicable to store the registered user setting table in a HDD or a memory card accessible by the apparatus.

Alternatively, the registered user setting table may be stored in an information server external to the apparatus. For example, by making the navigation apparatus 10 or the audio reproducing apparatus 100 communicable with an external information server via a network, such as the Internet, the navigation apparatus 10 or the audio reproducing apparatus 100 requests, when the user logs in by use of the IC card 90, the connected external information server for user setting information on the basis of the read card ID. Consequently, the requested user setting information can be downloaded from the external information server, thereby executing the setting in accordance with the card ID.

Thus, externally arranging a server storing the user setting table and accessing this server via a network allow more various use forms. For example, with a navigation device arranged on a rental vehicle for use by unspecified users, when a renting user logs in on the navigation device by use of the IC card 90, the navigation device downloads the user setting information from the external information server to execute a navigating operation in an environment unique to that user.

Executing the above-described processing by the navigation device when registering new users (or new card IDs) and editing registration information in such an environment enhances the ease of use for the user.

Various variations are possible to the navigation apparatus 10 and the audio reproducing apparatus 100 practiced as the above-mentioned embodiments of the invention. For example, a video device, a mobile phone, and household appliances may be practiced as embodiments of the present invention.

In addition, various variations are possible for the configurations of the navigation apparatus 10 and the audio reproducing apparatus 100. It is also practicable to combine the navigation apparatus 10 and the audio reproducing apparatus 100 into one unit.

In the above-described embodiments, the registration information to be stored in the registered user setting table includes a code number; however, the user setting information may only be stored in the registered user setting table in correspondence with at least the card ID, thereby eliminating the necessity of entering the code number.

Therefore, in this case, when new registration processing is executed on an unregistered IC card 90, the user is not demanded to enter a code number unlike the above-mentioned example.

The embodiments of the present invention in which the user can request each electronic device for new registration and registration information editing by use of the IC card 90 eliminate the necessity of the arrangement of controls for implementing these requests. Therefore, the embodiments of the present invention are suitable for those portable audio players, portable navigation devices, and portable game machines, for example, where there is little room for the arrangement of these controls.

In the above-described embodiments, an IC card is used as an example of a noncontact-type communications device; however, there are various other devices in which an IC chip is incorporated for noncontact-type communication by storing identification information like the IC card. For example, a mobile phone in which an IC chip is incorporated may be considered as a noncontact-type communications device as referred to herein to use these devices in substantially the same manner as the IC card used in the above-described embodiments.

While preferred embodiments of the present invention have been described using specific terms, such description is for illustrative purpose only, and it is to be understood that changes and variations may be made without departing from the spirit or scope of the following claims.

What is claimed is:

1. An electronic device comprising:
   a reader configured to read information from a noncontact-type communications device storing unique identification information; and
   a controller configured to determine whether said identification information read by said reader is already registered or not yet registered and, if said identification information is found already registered, get user setting information corresponding to said identification information to execute setting processing on the basis of said user setting information and, if said identification information is found not yet registered, execute processing for registering said identification information.

2. The electronic device according to claim 1, wherein, if said reader reads substantially the same identification information as identification information corresponding to certain user setting information in a state in which said electronic device is operating in a setting state based on said certain user setting information, said controller executes processing for editing registration information corresponding to said identification information.

3. The electronic device according to claim 1, further comprising:
   a display, wherein said controller displays a registration screen on said display as said processing for registration.

4. The electronic device according to claim 2, further comprising:
   a display, wherein said controller displays an editing screen on said display as said processing for editing registration information.

5. The electronic device according to claim 1, wherein said noncontact-type communications device is an integrated circuit card in which an integrated circuit chip having a noncontact-type communications circuit is incorporated.

6. The electronic device according to claim 1, wherein said electronic device is a navigation apparatus.

7. The electronic device according to claim 1, wherein said electronic device is an audio reproducing apparatus.

8. An operation control method for an electronic device having a reader for reading information registered in a noncontact-type communications device storing unique identification information, said operation control method comprising the steps of:

determining whether said identification information read by said reader has been already registered or not yet registered;
   obtaining, if said identification information is found already registered, user setting information corresponding to said identification information to execute setting processing based on said user setting information; and
   executing, if said identification information is found not yet registered, processing for registering said identification information.

9. The operation control method according to claim 8, further comprising the step of:
   if said reader reads substantially the same identification information as identification information corresponding to certain user setting information in a state in which said electronic device is operating in a setting state based on said certain user setting information, executing processing for editing registration information corresponding to said identification information.

10. The operation control method according to claim 8, wherein said electronic device further has a display, said operation control method further comprising the step of:
    displaying a registration screen on said display as said processing for registration.

11. The operation control method according to claim 8, wherein said electronic device further has a display, said operation control method further comprising the step of:
    displaying an editing screen on said display as said processing for editing.

12. The operation control method according to claim 8, wherein said noncontact-type communications device is an integrated circuit card in which an integrated circuit chip having a noncontact-type communications circuit is incorporated.

13. The operation control method according to claim 8, wherein said electronic device is a navigation apparatus.

14. The operation control method according to claim 8, wherein said electronic device is an audio reproducing apparatus.

15. An electronic device comprising:
    a reader configured to read information from a noncontact-type communications device storing unique identification information;
    a display; and
    a controller configured to determine whether said identification information read by said reader is already registered or not yet registered and, if said identification information is found already registered, get user setting information corresponding to said identification information to execute setting processing on the basis of said user setting information and, if said identification information is found not yet registered, execute processing for registering said identification information;
    wherein said controller executes at least one of a control operation for displaying a registration screen on said display as said processing for registration and a control operation for displaying an editing screen on said display as said processing for editing said identification information.

* * * * *